United States Patent [19]

Bartley et al.

[11] Patent Number: 4,913,252
[45] Date of Patent: Apr. 3, 1990

[54] MOTORIZED LUGGAGE

[76] Inventors: B. Dean Bartley, Box 256, Tahoka, Tex. 79373; George Spector, 233 Broadway RM 3815, New York, N.Y. 10007

[21] Appl. No.: 274,004

[22] Filed: Nov. 21, 1988

[51] Int. Cl.⁴ .............................................. B62D 61/00
[52] U.S. Cl. .................................. 180/208; 180/65.6; 180/209; 190/18 A; 200/332.2; 200/335
[58] Field of Search ...................... 180/315, 65.1, 65.6, 180/180, 181, 208, 209; 280/97, 87.041, 87.05, 220; 200/332, 332.2, 335; 190/18 A

[56] References Cited

U.S. PATENT DOCUMENTS

| | | | |
|---|---|---|---|
| 2,471,553 | 5/1949 | Zuckerman | 280/37 |
| 3,147,022 | 9/1964 | Amendola | 280/37 |
| 3,314,494 | 4/1967 | Weitzner | 180/208 |
| 3,316,993 | 5/1967 | Weitzner | 180/208 |
| 3,446,304 | 5/1969 | Alimanstiano | 280/37 |
| 3,476,201 | 11/1969 | Swaine | 180/65.6 |
| 3,934,669 | 1/1976 | Adams | 180/208 |
| 4,094,374 | 6/1978 | Adams | 180/208 |
| 4,411,343 | 10/1983 | Cassimally et al. | 190/18 A |

*Primary Examiner*—Charles A. Marmor
*Assistant Examiner*—Eric Culbreth

[57] ABSTRACT

An article of motorized luggage is provided and consists of a plurality of wheels rotatably journaled to bottom of a container body for allowing travel along the ground and a mechanism within the container body for driving one of the wheels to make the luggage a self-powered unit. In a modification a steerable platform is connected to the luggage so as to transport a person standing upon the platform.

2 Claims, 1 Drawing Sheet

MOTORIZED LUGGAGE

BACKGROUND OF THE INVENTION

The instant invention relates generally to portable mobile equipment and more specifically it relates to an article of motorized luggage.

Numerous portable mobile equipment have been provided in prior art that are adapted to contain structures therein so that the equipment can move upon a ground surface. For example, U.S. Pat. Nos. 2,472,491; 3,147,022 and 3,446,304 all are illustrative of such prior art. While these units may be suitable for the particular purpose to which they address, they would not be as suitable for the purposes of the present invention as heretofore described.

SUMMARY OF THE INVENTION

A primary object of the present invention is to provide an article of motorized luggage that will overcome the shortcomings of the prior art devices.

Another object is to provide an article of motorized luggage that includes a motor therein for driving wheels on the body of the luggage so as to make the luggage a self-powered unit.

An additional object is to provide an article of motorized luggage that includes a steerable platform thereon so that the luggage can transport a person standing upon the platform.

A further object is to provide an article of motorized luggage that is simple and easy to use.

A still further object is to provide an article of motorized luggage that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES.

DETAILED DESCRIPTION OF THE PREFERRED EMBODIMENTS

Figure 1:
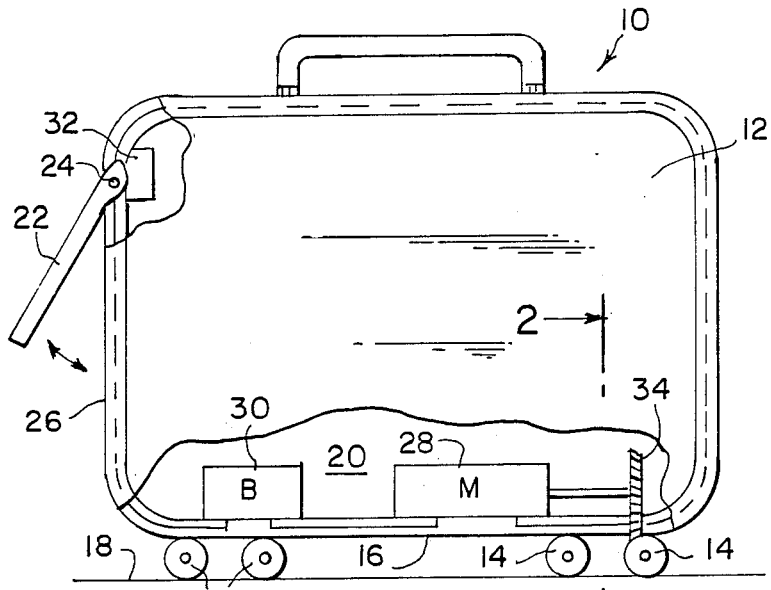
FIG. 1 is a side elevational view with parts broken away of the invention.

Turning now descriptively to the drawings, in which similar reference characters denote similar elements throughout the several views, FIG. 1 illustrates an article of motorized luggage 10 consisting of a container body 12 for holding various items therein. A plurality of wheels 14 are individually rotatably journaled to bottom 16 of the container body 12 for allowing the container body to travel along the ground 18. A mechanism 20 within the container body 12 is for driving at least one of the wheels 14 to make the luggage 10 a self-powered unit. A lever 22 is pivoted at 24 on one side 26 of the container body 12 for activating the driving mechanism 20 and for maneuvering the container body 12 when the luggage 10 travels along the ground 18.

Figure 3:
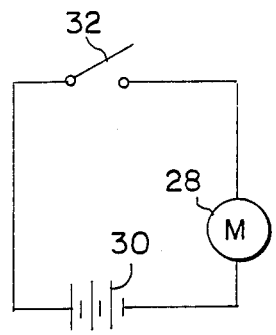
FIG. 3 is a schematic diagram of the electrical circuit of the invention.
Figure 2:
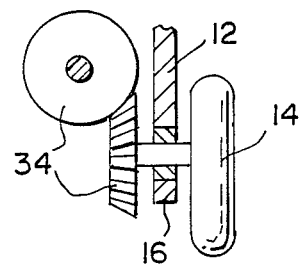
FIG. 2 is a cross sectional view taken along line 2—2 in FIG. 1, showing the bevel gear assembly in greater detail.

The driving mechanism 20 as shown in FIGS. 1, 2 and 3 includes a motor 28 for supplying rotatary motion. A battery 30 is for supplying electric current to the motor 28. A switch 32 is electrically connected between the motor 28 and the battery 30. The switch 32 is located adjacent the lever 22 whereby pivoting of the lever 22 upwardly will turn the switch 22 on. A bevel gear assembly 34 is located between the motor 28 and the wheel 14 so that the bevel gear assembly 34 will carry rotatary motion from the motor 28 to the wheel 14 when the switch 32 is turned on by the lever 22.

Figure 5:
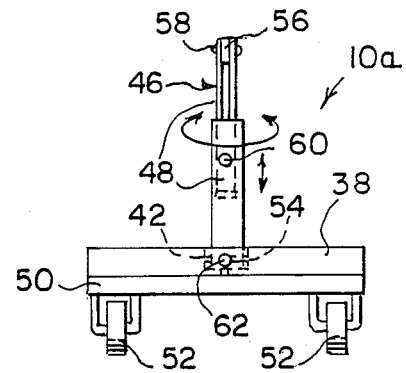
FIG. 5 is a front view taken in direction of arrow 5 in FIG. 4, showing the steering structure in greater detail.
Figure 4:
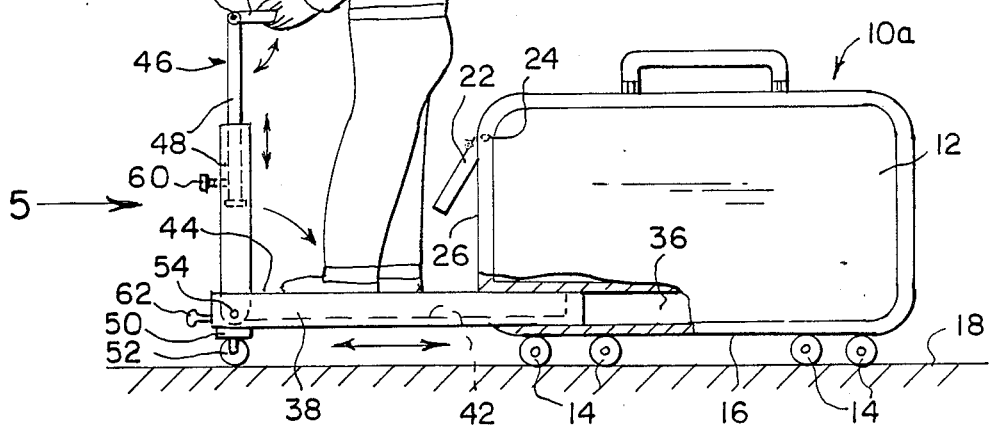
FIG. 4 is a side elevational view with parts broken away of a modification in which a person can ride upon a platform extending from the luggage and steer therefrom.

FIGS. 4 and 5 show a modified article of motorized luggage 10a further containing a horizontal track 36 carried within bottom 16 of the container body 12. A platform 38 is slideable substantially within the track 36 for transporting a person 40 standing thereupon. The platform 38 has a slot 42 within top surface 44 thereof. A structure 46 on front end of the platform 38 is held and manually operated by the person 40 for allowing the platform 38 to travel and be steered along the ground 18.

The travel and steering structure 46 includes an upright handle bar post 48 mounted at its lower end to the front end of the platform 38. A horizontal steering bar 50 is carried under front end of the platform 38 and centrally connected to and rotated by the upright handle bar post 48. A pair of spaced apart front wheel assemblies 52 are individually rotatably journaled to underside at each end of the steering bar 50 for allowing the platform 38 to travel and be steered along the ground 18.

The handle bar post 48 is telescopic, collapsible and can be pivoted at 54 from a vertical to a horizontal folded position into the slot 42 in the platform 38 to receive the handle bar post 48 therein before the platform 38 is slid within the track 36 for storage.

The handle bar post 48 further includes a handle 56 pivoted at 58 to top end thereof and a set screw 60 for locking the handle bar post 48 at various heights. A pull knob 62 is provided on front end of the platform 38 so as to aid in pulling and pushing the platform into the track 36.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An article of motorized luggage comprising:
  (a) a container body with a bottom for holding various items therein;
  (b) a plurality of wheels, individually rotatably journaled to said bottom of said container body for allowing said container body to travel along the ground;
  (c) means within said container body for driving at least one of said wheels to make said luggage a self-powered unit;

(d) an upwardly pivoting lever pivoted on a side of said container body for activating said driving means and for maneuvering said container body when said luggage travels along the ground; wherein said driving means includes:
(e) a motor for supplying rotary motion;
(f) a battery for supplying electric current to said motor;
(g) a switch electrically connected between said motor and said battery, said switch located adjacent said lever whereby pivoting of said lever upwardly will turn said switch on;
(h) a bevel gear assembly to carry rotary motion from said motor to said at least one of said wheels when said switch is turned on by said lever;
(i) a horizontal track carried within said bottom of said container body;
(j) a platform substantially slideable within said track for transporting a person standing thereupon, said platform having a slot within a top surface thereof and
(k) means on a front end of said platform held and manually operated by the person for allowing said platform to travel and be steered along the ground;
(l) said steering means comprising an upright handle bar post rotatably mounted at its lower end to said front end of said platform;
(m) said steering means further comprising a horizontal steering bar carried under the front end of said platform and centrally connected to and rotated by said upright handle bar post; and
(n) a pair of spaced apart front wheel assemblies, individually rotatably journaled to underside at each end of said steering bar for allowing said platform to travel and be steered along the ground.

2. An article of motorized luggage as recited in claim 1, wherein said handle bar post is telescopic, collapible and can be pivoted from a vertical to a horizontal folded position into said slot in said platform to receive said handle bar post therein before said platform is slid partially within said track for storage.

* * * * *